United States Patent [19]
Richards

[11] Patent Number: 5,653,455
[45] Date of Patent: Aug. 5, 1997

[54] SKIING SLED AND HARNESS

[76] Inventor: Mark L. Richards, 214 W. 1000 South, Ogden, Utah 84404

[21] Appl. No.: 330,364

[22] Filed: Oct. 27, 1994

[51] Int. Cl.$^6$ .................................................... B62B 13/02
[52] U.S. Cl. .................................... 280/19; 280/1.5
[58] Field of Search ........................ 280/1.5, 18, 18.1,
280/19, 19.1, 24, 28, 28.12, 28.16, 28.17,
608, 609, 15, 16, 17, 22.1, 22, 21.1

[56] References Cited

U.S. PATENT DOCUMENTS

| | | | |
|---|---|---|---|
| 3,077,617 | 2/1963 | Steffel | 280/18 |
| 3,295,859 | 1/1967 | Perry | 280/609 |
| 3,372,944 | 3/1968 | Lauritzen | 280/17 |
| 3,512,195 | 5/1970 | Porsche | 280/18 |
| 3,580,598 | 5/1971 | DePauw | 280/18 |
| 3,865,391 | 2/1975 | Melnick et al. | 280/18 |
| 5,090,714 | 2/1992 | Seekins et al. | 280/19 |
| 5,215,318 | 6/1993 | Capraro | 280/1.5 |

FOREIGN PATENT DOCUMENTS

| | | | |
|---|---|---|---|
| 1964299 | 6/1971 | Germany | 280/18 |
| 494087 | 5/1954 | Italy | 280/609 |

Primary Examiner—Richard M. Camby
Assistant Examiner—Frank Vanaman
Attorney, Agent, or Firm—A. Ray Osburn

[57] ABSTRACT

A sled to be pulled over snow by a skier, a snow shoer, or the like, with a waist attached, rigid towing member harness and a duffel container carried upon the sled. The sled has a plastic shell body with bottom runners designed to cause the sled to accurately follow the path of the skier.

31 Claims, 6 Drawing Sheets

SKIING SLED AND HARNESS

BACKGROUND OF THE INVENTION

1. Field

The field of the invention is sleds for use by cross country skiers to haul food, gear, clothing and the like.

2. State of the Art

Cross country skis are used for wintertime hikes of several hours and sometimes overnight duration. This requires considerable camping gear, clothing and food in quantities too unwieldy for comfortable backpack transport. Heavily loaded backpacks, located high upon the skier's body, create severe balance problems. The load carried by the skis is increased, causing them to sink deeply into the snow, and the skier is subjected to exhausting physical effort. Increased difficulties in maneuvering in and out of trees and across snow covered slopes does much to reduce the attractiveness of the sport. The clear need for gear transport in some manner other than by backpack has prompted many sled designs. Although relieved of burdensome weight, the skier using a sled encounters vexing sled control problems. Towed sleds tend strongly to gravitate downhill regardless of the path desired by the skier, which may be uphill or across slopes as well as on the level. The downhill drift of the sled encounters obstructions, for example, when the skier wishes to travel through trees or among outcropping rocks. The sled, and associated towing harness, must permit the skier to accurately tow the sled along the path of his choice. While many cross country ski designs have been proposed, none appear to be effectively designed for accurate tracking characteristics. Many appear to recognize the problem, but do not present effective solutions. U.S. Pat. No. 3,222,080 discloses a sled body having attached longitudinal runners extending downward from its bottom member. The runners have flat horizontal bottom surfaces and are symmetrical, and apparently do not anticipate in their design any resistance to lateral sled motion to prevent sidewise downhill sliding. U.S. Pat. No. 3,202,437 provides functionally similar bottom attached parallel runners upon a sled. U.S. Pat. No. 4,524,984 provides narrow runners at the sides of the bottom of a sled, each with an inwardly facing vertical side. With this sled bottom configuration, lateral sliding quickly causes the space between the runners to fill with snow, virtually destroying any resistance to side slip.

The principal shortcomings of all of these disclosed sled designs is failure to provide runners which selectively resist sidewise sliding of the sled down slopes being traversed. None appear to take lessons from the skiers themselves, who utilize the edges of downhill skis to hold traversing paths across the slopes.

Similarly, prior art harnesses do not provide the skier with effective control of the sled. The towing harnesses must be laterally rigid to enable the skier to resist sled sideslip. Limber rope or strap harness pulling devices are not satisfactory. Some prior art sleds provide for rigid harnesses. U.S. Pat. No. 3,741,577 discloses rigid, vertically pivoted arms, albeit designed for snowmobile towed sleds. In U.S. Pat. No. 5,090,714 is disclosed a rigid harness of metallic tubing connecting the belt of the skier with the leading edge of a sled. Two side members are pivotally secured along a common axis to the front of the sled and to a belt encircling the torso or waist of the skier. The towing harness is however made substantially rigid and unitary by a cross member between elongate side members near the skier, and further by a connecting cross member provided at the pivot. This unitary construction eliminates twisting flexibility between the skier and the sled, without which sled control is seriously impaired.

Practical, enjoyable, cross country ski sledding further requires easy storage of the gear upon the sled, preferably within a container which is itself removable from the sled. The prior art appears to include no such sled-duffel container combinations, so that the transport of duffel remains associated with spilling and loss.

A need for a cross country ski sled with associated harness, which is easily towed and controlled by the skier continues to exist. A further need is for a sled-duffel container combination which may be safely and efficiently used.

BRIEF SUMMARY OF THE INVENTION

With the foregoing in mind, the present invention eliminates or substantially alleviates the shortcomings of prior art cross country skiing sleds and associated harnesses. The sled comprises an upwardly opening plastic shell body, formed to have a generally flat bottom member with a longitudinal runner downstanding at each of its sides. The side runners are parallel and extend the full length of a lowermost snow contacting portion of the sled bottom. Each runner is configured to include a vertical surface facing outwardly of the sled body. Each runner has an inwardly facing surface angled substantially from vertical inwardly to join a central, generally flat bottom portion. The outward facing and inward facing runner surfaces join to form a lowermost, narrow edge the full length of each of the runners. On the downhill side of the slope traversing sled, the narrow edge causes the downhill runner to cut into the snow to substantially resist any downhill slideslip of the sled body. In contrast, the uphill runner offers little resistance to sidewise down sliding of the sled, instead tilting the sled body to increase the bite of the downhill runner. Upon all but the most icy slopes, the downhill runner positively prevents sideslip of the slope traversing sled.

For stiffening only, a relatively small central rib downstands from the bottom member of the sled. A horizontal rim flange is preferably provided all around the upper edge of the body, joined integrally with side, rear and front walls. The latter curves upwardly to meet the flange, and has a stiffening crease to effectively resist rocks, low stumps and the like which may obstruct forward motion of the sled. The flange, outwardly extending all around, stiffens the body substantially, and provides for connection of an associated towing harness and a duffel container.

A sled towing harness connects the front end of the sled and waist of the skier, and comprises a pair of elongate metallic tubes, preferably of chrome molybdenum steel treated for rust resistance. The sled end of each rod is curved, preferably compoundly, to provide an end portion directed laterally to the sled, and to align the rod with a clevis post bolted to the sled body flange. The clevis post has a cross bore accepting the lateral end portion.

The skier end of the harness comprises a flexible belt member encircling the waist of the skier, preferably with a quick-connect-disconnect buckle. The forward end of each towing rod carries a belt connecting block, preferably of low temperature resistant plastic, secured to the rod by a bolt and nut. Each block has an elongate vertical slot near its forward end. A loose loop of a strip of flexible material sewn to the flank side of the body encircling belt extends through the vertical slot. The rod-belt connection is completed by a pin secured to extend through the loop on the outside of the block. Advantageously, a carabiner is utilized. Because of the flexibility of the loop and belt material, the two rigid arms of the harness are allowed to flex largely independently of each other at the waist, with the clevis post to rod engagement still providing needed sideways stiffness for effective control over lateral sled motion.

In accordance with another aspect of the invention, a duffel bag is provided with one side preferably shaped to conform to the inside surface of the sled body, along with a connecting top side dimensioned to provide ample additional space for storage well above the level of the upper rim flange of the sled body. The top and bottom portions join into a horizontal flange of stitched together fabric material. This member is wide enough to be folded beneath the sled body flange and secured by a draw cord or the like.

It is therefore the principal object of the invention to provide an improved carrying sled and associated harness for cross country skiers, with improved tracking characteristics and increased control by the skier. Another principal object is incorporation of improved capability for transport of associated gear.

BRIEF DESCRIPTION OF THE DRAWINGS

In the drawings, which represent the best modes presently contemplated for carrying out the invention.

DETAILED DESCRIPTION OF ILLUSTRATED EMBODIMENT

Figure 1:
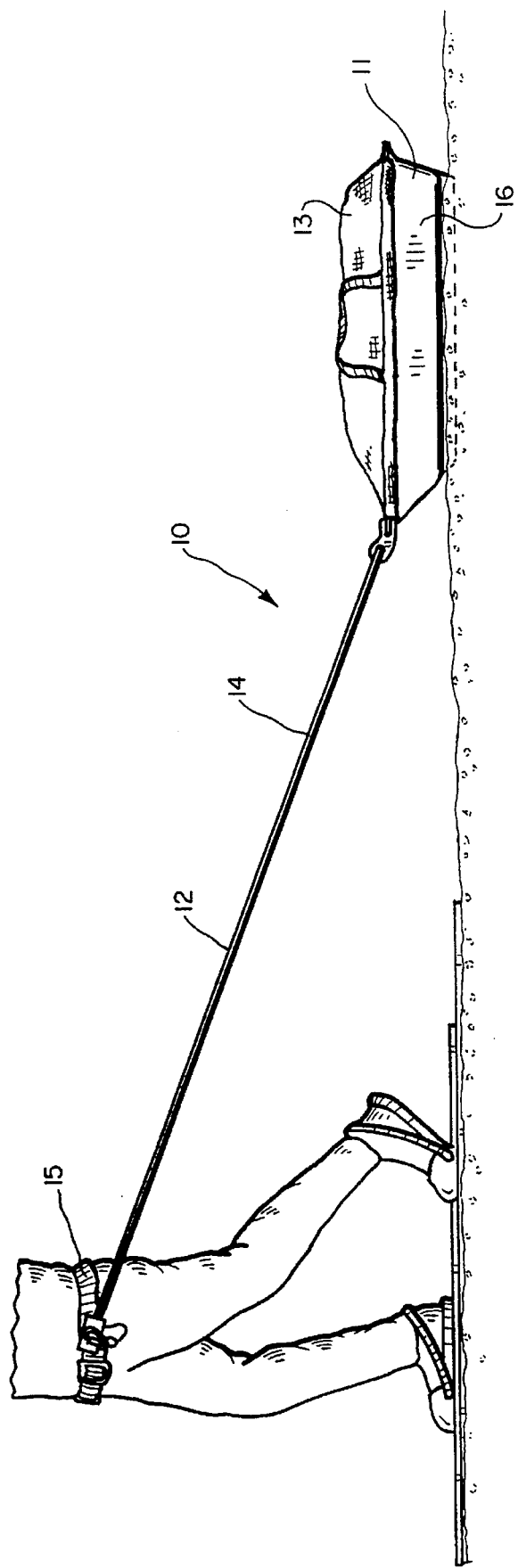
FIG. 1 is a side elevational of a sled and harness combination in accordance with the invention, in use by a skier, drawn to a reduced scale, FIG. 2 a perspective view of a fragment of the harness of the invention, drawn to a reduced scale larger than the scale of FIG. 1, FIG. 3 a perspective view of a fragment of the invention including a sled body, and attached duffel, and fragments of a pair of towing rods of the harness, drawn to the scale of FIG. 2, FIG. 4 a right upper perspective view of the sled body of the invention, drawn to a slightly larger scale than that of FIG. 3, FIG. 5 a side elevation view of the sled body of FIG. 4, drawn to substantially the same scale, FIG. 6 a cross sectional view of the body of FIG. 5, taken along line 6—6 thereof, said body depicted as resting upon a lateral directed slope, drawn to the scale of FIG. 5.
Figure 3:
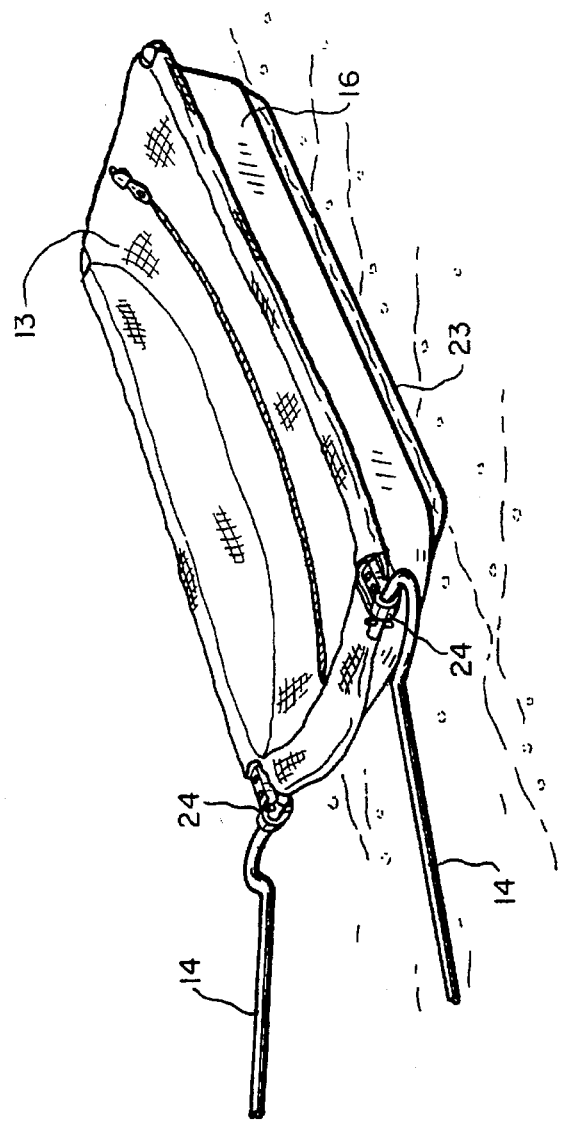
Figure 2:
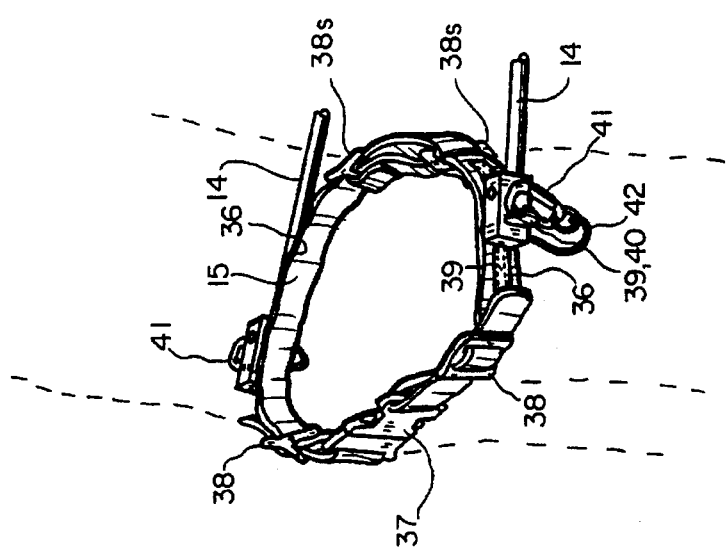
Figure 4:
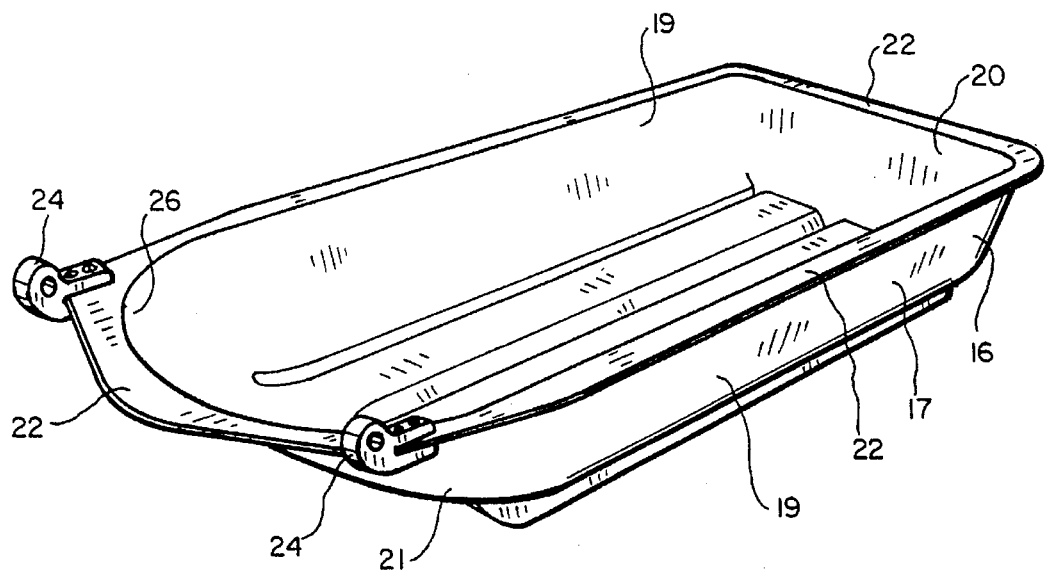
Figure 5:
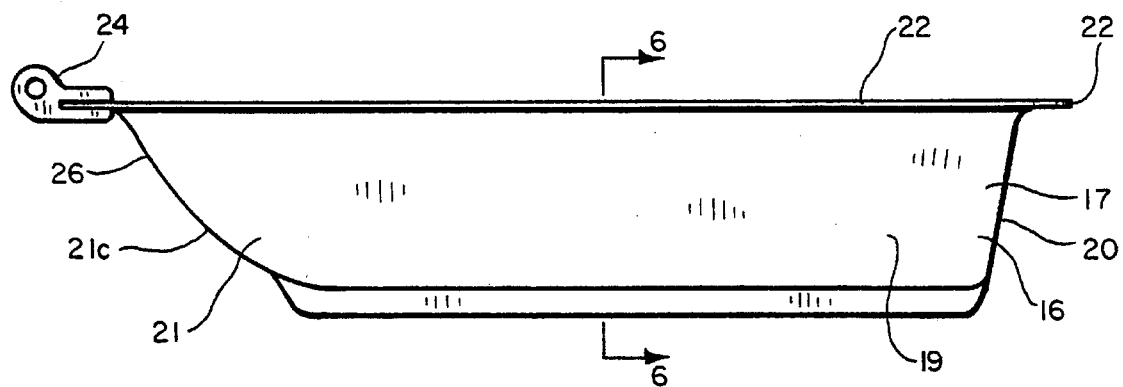

A cross country skiing sled and harness assembly 10 in accordance with the invention comprises a sled assembly 11 and a harness assembly 12, with a duffel bag 13 in place upon the sled assembly. (FIGS. 1–3) Harness 12 comprises a pair of rigid tow rods 14, approximately six feet in length, and a waist encircling flexible belt assembly 15. As later described in more detail, each rod 14 is pivotally secured to sled 11 and belt 15.

Figure 6:
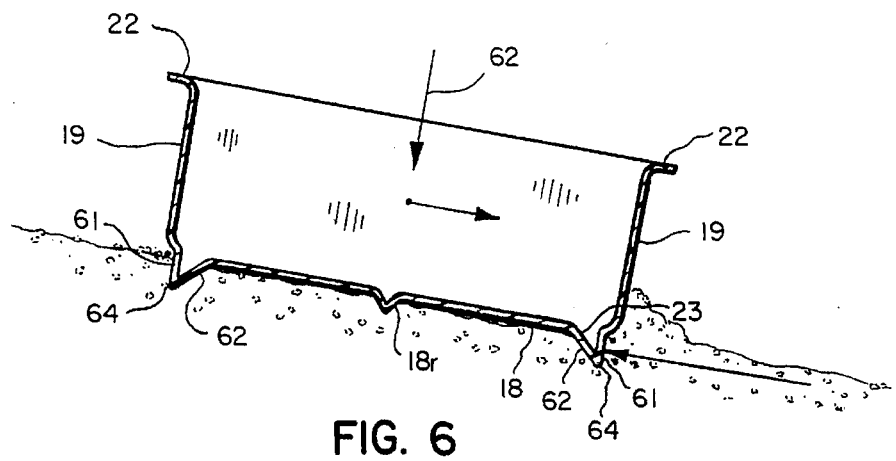
Figure 7:
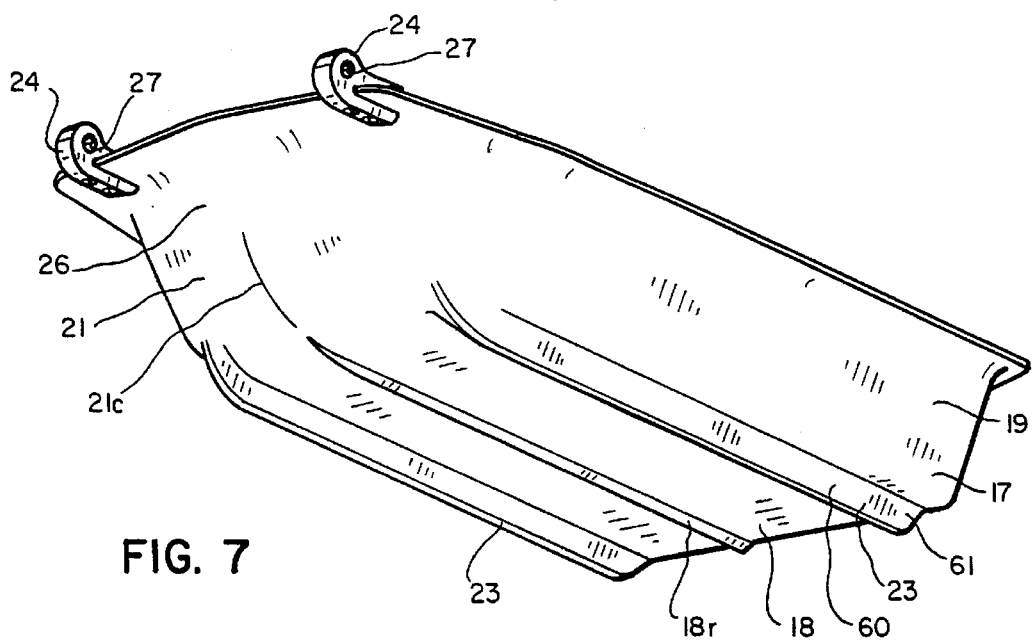
FIG. 7 a lower right, upwardly seen perspective view of the sled body of FIG. 4, drawn to substantially the same scale, FIG. 8 an exploded view of a fragment of the embodiment of FIG. 1, drawn in perspective, including one of the tow rod connecting pivot posts and a fragment of the sled body horizontal flange to which the post is attached, drawn substantially full scale, FIG. 9 a plan view of the fragment of FIG. 8, the components thereof however being assembled, drawn to a somewhat reduced scale, FIG. 10 a perspective exploded view of a fragment of the embodiment of FIG. 1 showing connecting components joining one of the tow rods and the belt of the harness of the invention, drawn to substantially full scale, FIG. 11 a perspective exploded view of the sled body-duffel bag combination of the invention, drawn to the scale of FIG. 4, FIG. 12 a cross sectional view of a fragment of one of the runners of the sled body of FIG. 6, having a downwardly convex lowermost edge, drawn to approximately one-half scale, FIG. 13 a cross sectional view of a fragment of one of the runners of the sled body of FIG. 6, having a horizontally planar lowermost edge, drawn to approximately one-half scale, FIG. 14 a cross sectional view of a fragment of one of the runners of the sled body of FIG. 6, having a downwardly opening concave lowermost edge, drawn to approximately one-half scale, and FIG. 15 a cross sectional view of a fragment of one of the runners of the sled body of FIG. 6, having a knife edge lowermost edge, drawn to approximately one-half scale.
Figures 12, 13, 14, 15:
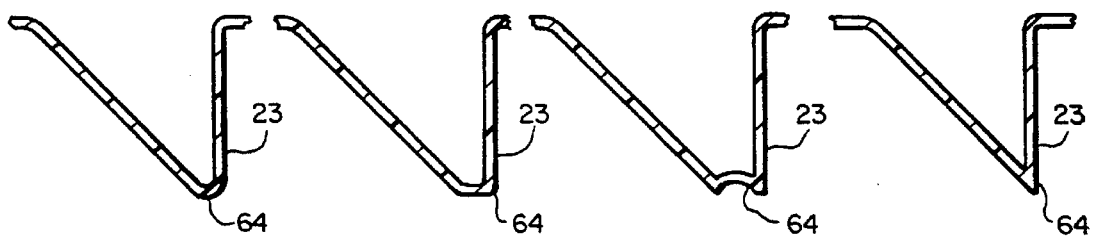

Sled assembly 11 comprises a body 16 in turn comprising an upwardly opening hollow shell 17 formed to include a bottom member 18 integral with upstanding sidewalls 19, a near vertical rear wall 20 and a forwardly and upwardly sloping front wall 21, the latter constructed with a central crease 21c for strength against encountered stones, low tree stumps or the like. (FIGS. 3–7) Body 16 also has a planar horizontal flange 22 all around its uppermost rim integral with the upstanding walls. The shell 17 of body 16 is approximately 0.187 inches thick and comprises plastic material to which snow does not adhere, and which remains strong and elastic at very low temperatures, without brittleness. Preferably, shell 17 is of vacuum formable material, and available in sheet form. A high molecular weight polyethylene plastic, for example, is very suitable. This material is extremely lubricous on snow. It has the disadvantage that no glue will adhere to it any more than will snow. It is however very workable and strong, so that fastening parts together using bolts in threaded or unthreaded bores is very practical. Sled body 16 is illustrated in cross section in FIG. 6, and the bottom member 18 is shown in FIG. 7. A central flat portion of bottom member 18 is stiffened by a small longitudinal rib 18r, and extends between a pair of relativey large side runners 23. The design of member 18 including the runners is crucial to successful performance of sled and harness assembly 10, and is further discussed below.

Figure 9:
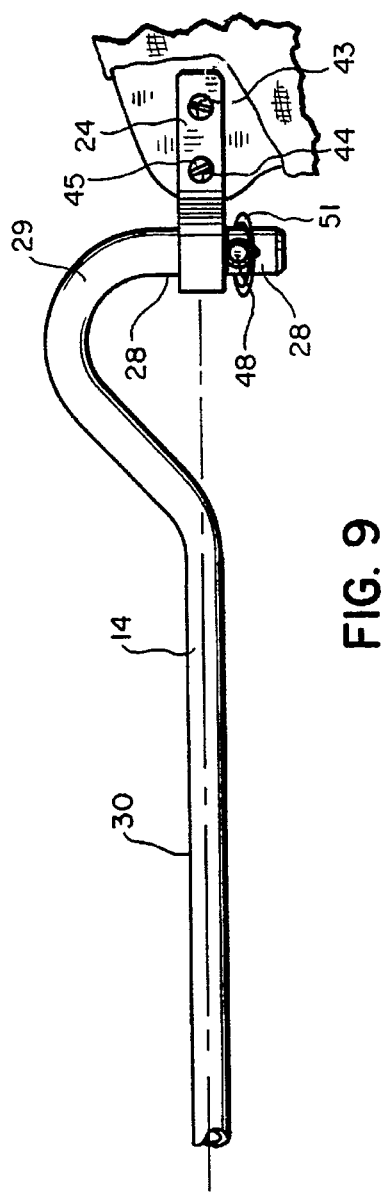
Figure 8:
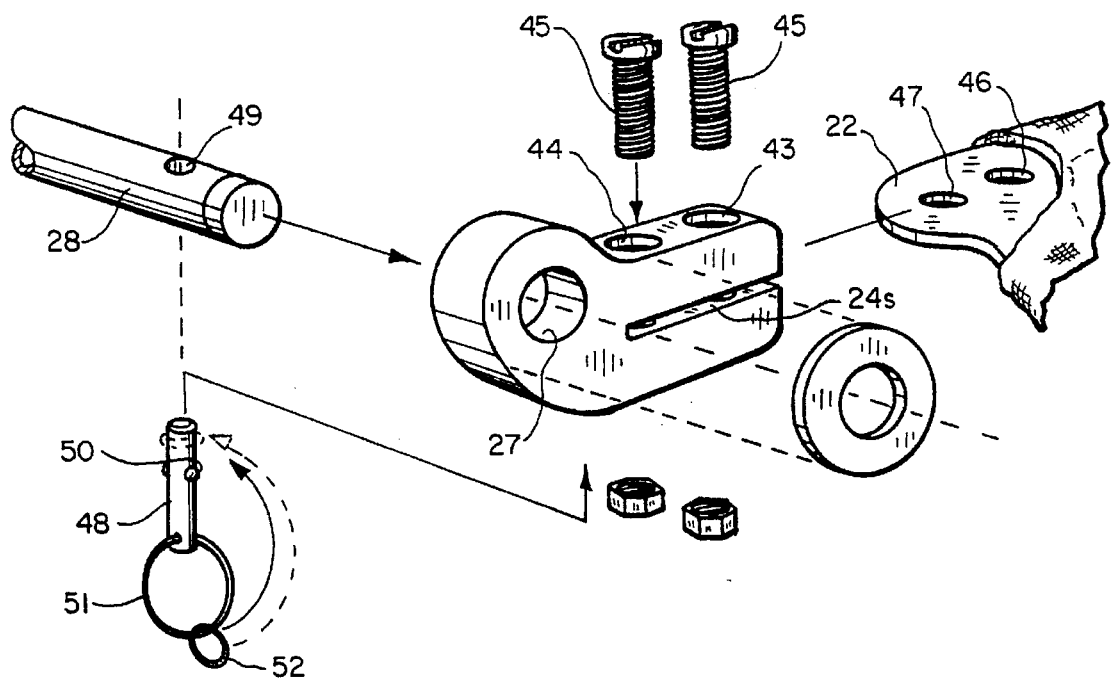

For connection of tow rods 14, a pair of clevis posts 24 are secured to the outstanding flange 22 at each side of the front 26 of sled body 16. (FIGS. 3–9) Clevis posts 24 carry laterally aligned bores 27, each accepting a laterally directed end portion 28 of a compoundly curved end section 29 of one of the tow rods 14. (Exploded view FIG. 8) The end portions 28 rotate within the clevis bores 27, to allow sled body 16 to adjust to uneven snow along the path. Elongate portions 30, and the tensile or compressive forces therein, are aligned perpendicular to bores 27 at their longitudinal centers. (FIG. 9) Each clevis post 24 has a pair of vertical bores 43 and 44 accepting bolt and nut assemblies 45. The clevis bolt bores each meet with one of the vertical bores 46 and 47 through rim flange 22 of sled body 16, with slit 24s accepting flange 22. A retaining pin 48 engages cross bore 49 through the laterally directed end portion 28 of each harness rod 14. Pins 48 are each preferably retained within bore 49 by internally spring loaded detents 50. Each pin 48 carries a finger ring 51 for forcible withdrawal. To even more securely retain pin 48, finger ring 51 is rotated to a position around end 28 of rod 4, held by an elastic "O" ring 52 stretched around pin 48. (FIG. 8)

Clevis lateral bores 27 are located sufficiently above the plane of the upper surface of flange 22 about the upper rim of sled body 16 to permit the rods 14 to be rotated to lie along flange 22 for storage.

Figure 10:
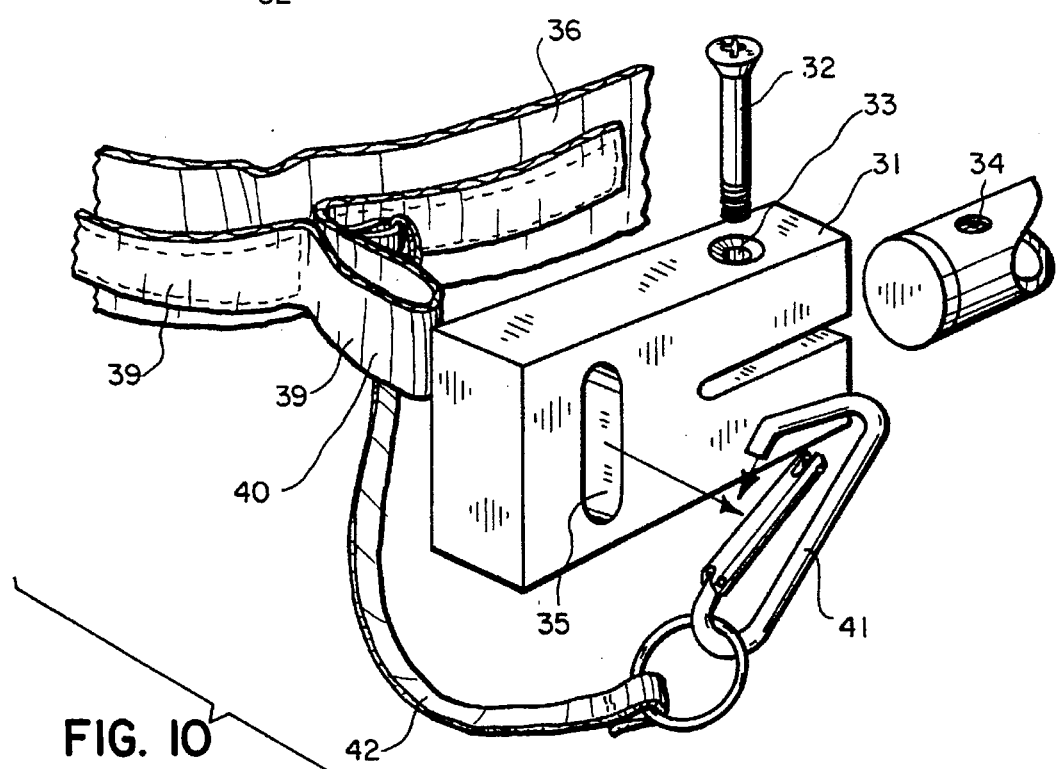

At the skier end of harness assembly 12, each rod 14 terminates at a block 31, secured by a bolt and nut assembly 32 installed through matching bores 33 and 34 in block 31 and harness rod 14 respectively. (FIG. 10) A vertical slot 35 through attachment block 31 is used to attach belt assembly 13 as described below.

Flexible material waist band 36 of belt 15 girds the waist of the skier, secured in front by a quick connect-disconnect squeeze release buckle assembly 37. (FIG. 2) A pair of ferrules 38 allow symmetrical adjustment of the front portion of belt 15, placing center buckle 37 equidistant from the terminal blocks. A rear ferrule 38r and a slide loop 38s similarly allow adjustment of the rear portion to place the blocks 31 accurately at each side of the waist. A pair of flexible fabric auxiliary strips 39 are sewn to the waist band 36 at each side of the waist, each with a central portion free to be formed into a loop 40, which is inserted through one of the slots 35 in terminal blocks 31. (FIG. 10) Carabiner devices 41 secure loops 40, and are in turn secured against loss by small retaining straps 42. Flexible loops 40 render connections freely the rod-belt connections freely twistable in all directions.

The rigid tow rods 14 are very advantageously made of ⅝" diameter chrome-molybdenum alloy steel, providing strength needed to withstand the bending forces in the reversely curved end sections 29, from the towing loads from the elongate central rod portions 30. (FIGS. 2, 3 and 9) Rods 14 must also on occasion resist buckling from compressive forces. Sideways sliding of the sled down steep slopes cause the rods to shear and bend sideways, requiring both high strength and high elasticity. For these reasons, lighter rod materials, such as aluminum or plastic, are much less satisfactory, although perhaps of desirably reduced weight. Desirably, the steel rods 14 are treated on inside and outside surfaces for corrosion resistance. In one satisfactory process, dry powdered paint, electrically charged, is sprayed onto the outside rod surface. Subsequent baking produces a permanently bonded, attractive rust resistant surface coating which does not flake. The inside surface is coated with a heavy rust preventing oil jelled in place.

Figure 11:
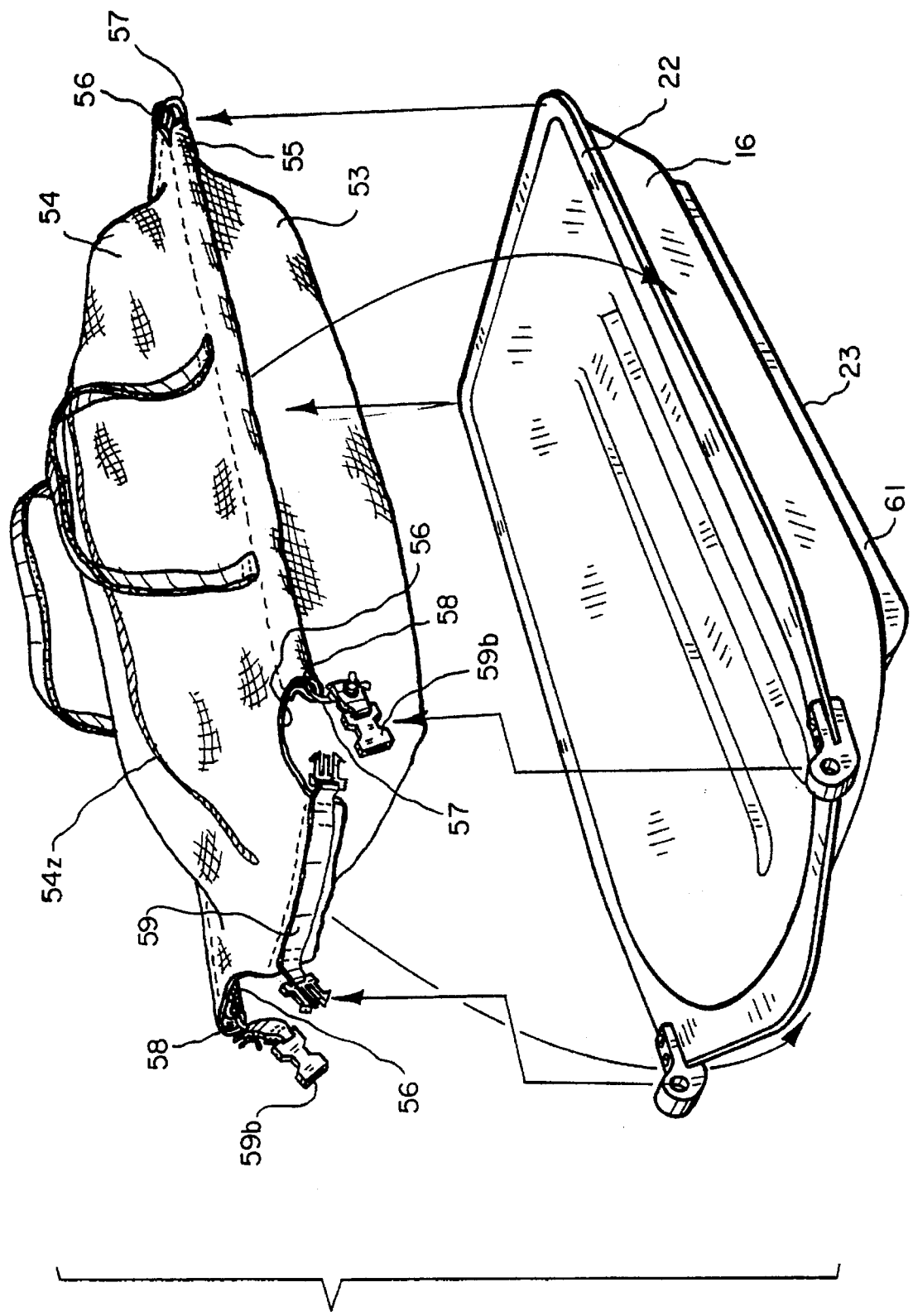

Sled and harness assembly 10 preferably includes the flexible fabric duffel bag 13 comprising a bottom portion 53 secured to a top portion 54 through an outstanding fabric flange 55. (FIGS. 1, 3 and 11) Zipper fastener 54z in top 54 provides bag access. Corner notches 56 facilitate folding flange 55 under sled flange 22 substantially all around the top of sled body 16. A cord 57, preferably of Nylon is inserted within a loop 58 formed into fabric flange 55. The cord loop extends along both sides and the rear of sled body 16. At the front, a strap 59 stitched to bag flange 55 carries quick disconnect buckle components 59b at each of its ends, receiving mating components secured to the ends of cord 57 emerging from loop 58.

Lower portion 54 of duffel bag 13 is preferably shaped to substantially conform to the inside contours of sled body 16, while the top portion 54 is shaped to accommodate storage of items piled well above body flange 22.

As stated above, the configuration of the bottom member 18 of sled body 16 is critical to successful performance of sled and harness assembly 10. The pair of parallel downstanding side runners 23 constrain the sled to closely follow the path of the skier, i.e. to "track" accurately, even when the skier traverses across the "fall line" of quite steep slopes. To accomplish this, each side runner 23 incorporates an outwardly facing, vertical edge surface 61, preferably about 1½ inches in height. (FIG. 6) With this configuration, sidewise drift of the sled body 16 is substantially eliminated, even on slopes which are quite steep, by the downhill runner 23 digging into the snow. The weight 63 of the loaded sled causes the lower, narrow edges 64 to penetrate downwardly into the snow, even if it is crusted. The runners typically sink sufficiently so that bottom member 18 of sled body 16 rest upon the snow. If any side slide begins, the considerable area of the outside vertical surface 61 is pressed against the snow, effectively resisting any further side slip. Snow will also pile against the adjacent vertical sidewall 19, to further arrest sidewise motion. (FIG. 6) At same time, the gradually sloping inward surface 62 of the runner on the uphill side of the sled body slides sidewise easily over the snow, causing no excessive buildup of piled snow beneath sled bottom 18. Such buildup must not be allowed to occur, since it would tend to lift the side runners both from the snow, resulting in complete lack of control of sidewise motion by either runner. With the described configuration, if any sideslip occurs, the inwardly tilted surface 62 of the inside of the uphill runner 23 tips the sled slightly, shifting more of the weight 63 to the downhill runner to increase its bite into the snow.

Providing that lower edge 64 is narrow enough to bite deeply into the snow, several satisfactory configurations may be used, including convex, concave, planar, and knife edge. (FIGS. 12–15)

Accurate tracking of sled 11 is further assured by the vertically pivoting but laterally rigid connections of the tow rods 14 to sled 11 through bores 27 of clevis posts 24. Any sidewise slipping is felt and resisted by the skier through belt assembly 15.

Other materials than those preferred and described may be employed without departure from the spirit of the invention, as may other methods of construction, although likely with penalties of increased towing resistance, increased weight, and increased expense, along with decreased sled control. The spirit of the invention is expressed in the claims, which are intended to embrace the specific features of the invention within the limitations thereof, and all features equivalent thereto.

What is claimed and desired to be secured by United States Letters Patent is:

1. A sled device to be pulled over snow by a skier, comprising:

an elongate sled body having a generally planar bottom member with a snow contacting lowermost surface and a pair of opposed sides, a pair of elongate parallel runners substantially the full length of said bottom member, each runner downstanding therefrom at each of said sides; wherein each of said runners comprises an outwardly facing planar vertical surface, and an inwardly facing planar surface slanted substantially upwardly and inwardly from vertical and extending to join the snow contacting surface, said outwardly and inwardly facing surfaces being joined to form a substantially narrow elongate lowermost edge parallel to the bottom member; and means for attaching a harness to the sled body, for towing the sled body over snow.

2. The sled device of claim 1, wherein:

the elongate lowermost edges each comprise a downwardly convex curve joining with associated inwardly and outwardly facing surfaces.

3. The sled device of claim 2, wherein:

a width of the convexly curved lowermost edge does not exceed one-half inch.

4. The sled device of claim 1, wherein:

the width of the lowermost edge does not exceed one-half inch.

5. The sled device of claim 1, wherein:

the elongate lowermost edges each comprise a horizontal surface joining with associated inwardly and outwardly facing surfaces.

6. The sled device of claim 1, wherein:

the elongate lowermost edges each comprise a downwardly concave curve joining with associated inwardly and outwardly facing surfaces.

7. The sled device of claim 6, wherein:

a width of the concavely curved lowermost edge does not exceed one-half inch.

8. The sled device of claim 1, wherein:

the elongate lowermost edges each comprise a knife edge joining with associated inwardly and outwardly facing surfaces.

9. The sled device of claim 1, wherein the sled body further comprises:

a pair of side wall members each upstanding from the bottom member at one of the opposed sides thereof;

a rear wall member upstanding from a back end of the bottom member; and a front wall member upstanding from a front end of the bottom member.

10. The sled device of claim 9, wherein:

at least the planar bottom member and the pair of runners are comprised of a single, continuous thin shell.

11. The sled device of claim 10, wherein:

the side wall, rear wall and front wall members, the bottom member and the runners comprise a continuous, upwardly opening shell.

12. The sled device of claim 11, wherein:

the harness attaching means is carried by the front wall member upwardly thereon.

13. The sled device of claim 11, wherein the continuous shell further comprises:

an outwardly projecting continuous horizontal flange integral with the side wall, rear wall and front wall members all around the sled body uppermost thereon.

14. The sled device of claim 13, wherein:

the harness attaching means is carried by the horizontal flange at the portion thereof at the front wall member.

15. The sled device of claim 13, wherein:

the material of the shell is high molecular weight polyethylene.

16. The sled device of claim 14, wherein:

the shell is of plastic material.

17. The sled device of claim 11, wherein: the shell is of plastic material.

18. The sled device of claim 17, wherein:

the material of the shell is high molecular weight polyethylene.

19. The sled device of claim 11, wherein:

the shell is of metallic material.

20. The sled device of claim 10, wherein:

the shell is of plastic material.

21. The sled device of claim 10, wherein:

the shell is of metallic material.

22. The sled device of claim 1, further comprising:

a harness assembly connecting the sled body to the body of the skier.

23. The sled device of claim 22, wherein the harness assembly comprises:

a pair of separate, independent, elongate rigid towing members each having a skier end and a sled end, each of said members connected only to a side of the waist of the skier and to a corresponding side of the front of the sled body.

24. The sled device of claim 23, wherein:

the sled ends of the towing members are secured to the sled body pivotally along a common transverse axis; and the skier ends of the towing members are secured to the waist to be pivotal at least about a common axis transverse to the skier.

25. The sled device of claim 24, wherein:

the sled end of each towing member carries an elongate, laterally directed, cylindrical end portion, and the harness attaching means comprises a pair of clevis posts carrying laterally aligned bores therethrough, each bore accepting said end portion of an associated towing member.

26. The sled device of claim 23, wherein:

the sled end of each towing member carries an elongate, laterally directed, cylindrical end portion; and the harness attaching means comprises a pair of clevis posts carrying laterally aligned bores therethrough, each accepting said end portion of an associated towing member.

27. The sled device of claim 26, wherein:

the towing members each comprise an elongate tubular rod curved near the sled to provide the laterally directed end portion.

28. The sled device of claim 27, wherein the harness assembly further comprises:

a belt assembly having elongate strips of flexible material joined to encircle the waist of the skier; and means flexibly connecting the skier end of each of the towing members to the belt assembly at the associated side of the waist of the skier.

29. The sled device of claim 28, wherein the flexibly connecting means comprises:

an auxiliary strip of flexible material secured to the belt assembly at each side of the skier to form a loop outstanding therefrom;

a loop accepting slot at the skier end of each towing member; and loop retaining means including a pin inserted through the loop at an outermost side of the skier end of each towing member.

30. The sled device of claim 29, wherein:

the loop accepting slot is carried by a terminal block secured to the skier end of each towing member.

31. The sled device of claim 29, wherein the towing members are each compoundly curved so that an elongate uncurved portion of each is longitudinally aligned with a longitudinal centerline of the laterally directed bore carried by the associated clevis post.

* * * * *